United States Patent [19]

Knoll et al.

[11] Patent Number: 4,731,526
[45] Date of Patent: Mar. 15, 1988

[54] PROCESS FOR PICKING UP NAVIGATION DATA

[75] Inventors: Peter Knoll, Ettlingen; Winfried König, Pfinztal-Burghausen; Peter Rapps, Karlsruhe; Thomas Walz, Pforzheim, all of Fed. Rep. of Germany

[73] Assignee: Robert Bosch GmbH, Stuttgart, Fed. Rep. of Germany

[21] Appl. No.: 821,560

[22] Filed: Dec. 18, 1985

[30] Foreign Application Priority Data

Aug. 6, 1984 [DE] Fed. Rep. of Germany ....... 3428847
May 10, 1985 [WO] PCT Int'l Appl. ... PCT/DE85/00154

[51] Int. Cl.[4] .............................................. G06K 7/10
[52] U.S. Cl. ..................................... 235/472; 235/462; 235/494
[58] Field of Search ...................... 235/462, 472, 494

[56] References Cited

U.S. PATENT DOCUMENTS 4,445,028  4/1984  Huber .................................. 235/472

FOREIGN PATENT DOCUMENTS 2077975  12/1981  United Kingdom .

Primary Examiner—Harold I. Pitts
Attorney, Agent, or Firm—Michael J. Striker

[57] ABSTRACT

A process for determining navigation data from a map wherein a line code lattice is superposed on the map and scanned by a sensor. The crossing line codes in the lattice differ one from the other.

17 Claims, 9 Drawing Figures

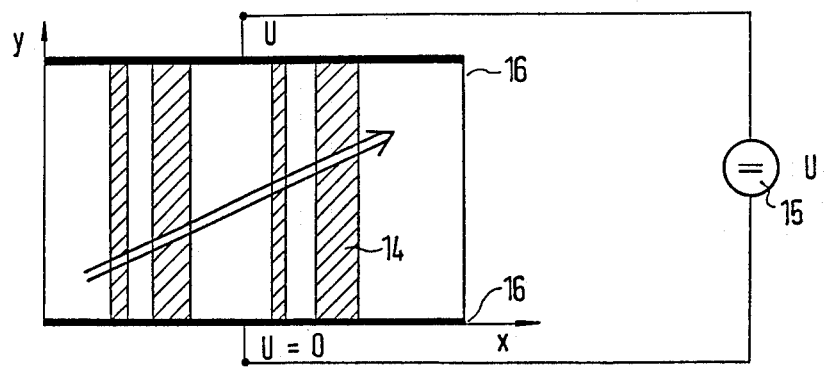
FIG.6
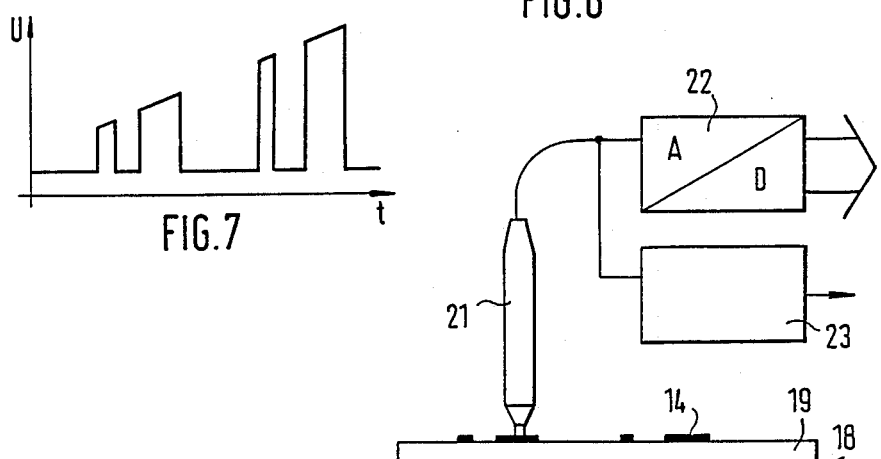
FIG.7
FIG.8
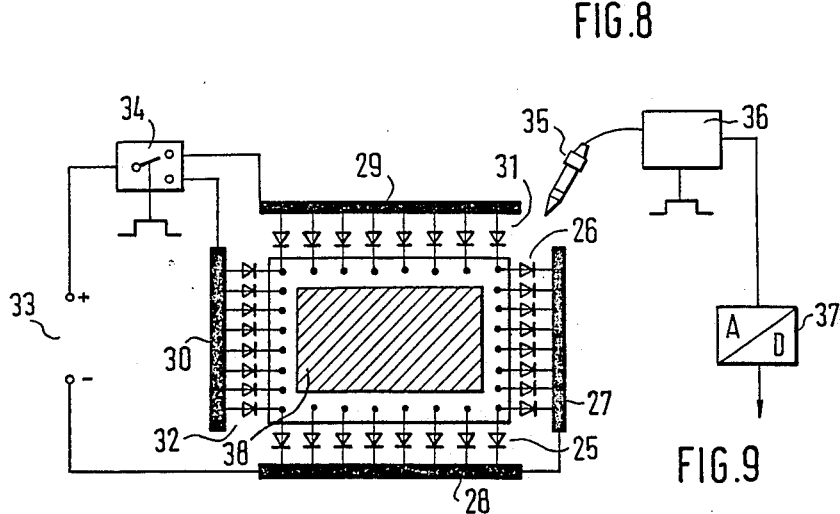
FIG.9

PROCESS FOR PICKING UP NAVIGATION DATA

STATE OF THE ART

The invention is based on a process for determining navigation data from a map, particularly for use in vehicles. Recently, a number of navigation processes became known for vehicles wherein with the assistance of the coordinates of the starting point of the travelling route and with the assistance of a coupling navigation device of the vehicle, the momentary position of the vehicle is continuously determined while the given location is indicated by a display device on a plan. For example, such a navigation process is known from the DE-OS 29 36 774. There, the location of the vehicle is indicated on a plan (segment of the map) by an arrow being directed upwardly and in the driving direction, for example. During the travelling of the vehicle the map is moved against the arrow indicating the driving direction by means of the measured direction and road signals and is turned around the location of the vehicle. For the viewer the location and travelling direction arrow apparently moves along the desired roads and is always directed upwardly. This type of indication is sometimes vague and not desirable. Therefore, in the German patent application 33 41 679 a device is proposed wherein before the start of the trip the desired travelling route is established by means of a coding device and a map which is inserted into the device, whereby the desired travelling route is indicated by a coding pen and the position of the points are stored. During the travelling the desired travelling route is indicated at least temporarily in the area of the momentary location in addition to the indicated location. A coding device is used for coding the desired travelling route, with the assistance of a pen, which is mounted on two tape bars, travelling from the location to the desired location along the available street system of the map. The given direction and the given length of the tape is determined by defined time intervalls. The driving direction can then be stored with the obtained results. This device is very cumbersome in its structure and expensive. In addition mechanically operating devices are disadvantageous in that they must be stable and are therefore very heavy.

ADVANTAGES OF THE INVENTION

The process in accordance with the invention is advantageous in that it can be simply made and used and that no expensive technical measures have to be taken. The storing of the travelling route occurs in that one indicates the road route with a pencil on the map whereby, for example, the required pulses for evaluation are generated in the electronic of the coupling navigation device by means of a line code lattice. Thereby, the line code lattice may be imprinted on the map itself or a foil has to be mounted on the map. The technical expenses are limited to the pen and the evaluation electronic.

It is advantageous to provide the line grating with a coding. Thereby, it is possible to recognize in which direction the scanning pen did pass the line code lattice. Thus, the definite determination of the movement direction of the pen is possible. Advantageous codings are the use of two lines which are different in their width and/or their distance. A further advantageous coding is the use of different colors. In order not to reduce the readability of the maps it is advantageous to mark the coding on the maps with inks which are not visible to the human eye. Fluorescing and phosphorescing ink substances are advantageous for this purpose. It is also advantageous to use infrared absorbing or reflecting substances. Advantageously, the line grating is directly imprinted on the map or, if one uses customary map material, it is placed onto a foil which can be placed on the map. Further embodiment possibilities are obtained in that the line code lattice is provided with elevations or embossings which can be mechanically scanned. A further advantageous possibility is to mount the line code lattice as a transparent conductive electrode. The line code lattice can be substantially simplified if the conductive electrode is designed as a resistor. It is then advantageous to mount the dotted lines, whereby the further coordinates are defined by the resistance value. It is also advantageous to replace the line code lattice by a continuous, uniform transparent resistor layer.

The structures and/or the resistor layer are advantageously imprinted on the map or are mounted on a foil which can be placed on the map. It is also favorable if the materials for mounting the line code lattice are chosen in such a manner that they are transparent or only slightly visible. Thereby the map remains very well readable.

DRAWING

Exemplified embodiments of the invention are illustrated in the drawing and are explained in more detail in the following description.

FIG. 6 illustrates an example with code lines shaped as resistors, FIG. 7 illustrates a diagram for explaining the mode of operation in accordance with FIG. 6

FIG. 8 illustrates a scanning pen to be used in accordance with the exemplified embodiment in accordance with FIGS. 6 and 9 with a graphic table

DESCRIPTION OF THE INVENTION

Figure 1:
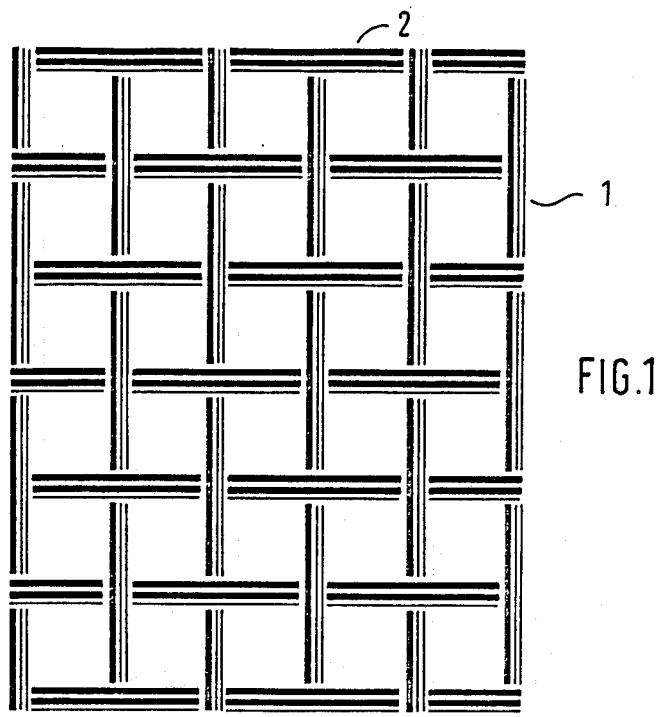
FIG. 1 illustrates a first embodiment of the line code lattice.
Figure 2:
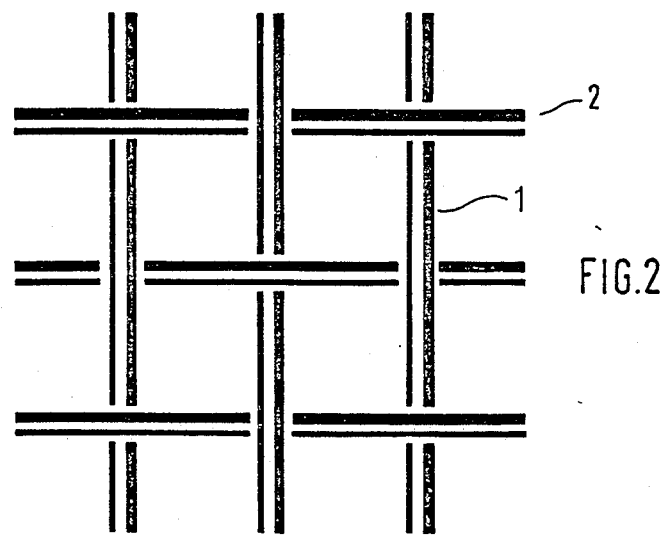
FIG. 2 illustrates a second exemplified embodiment of the line code lattice.
Figure 3:
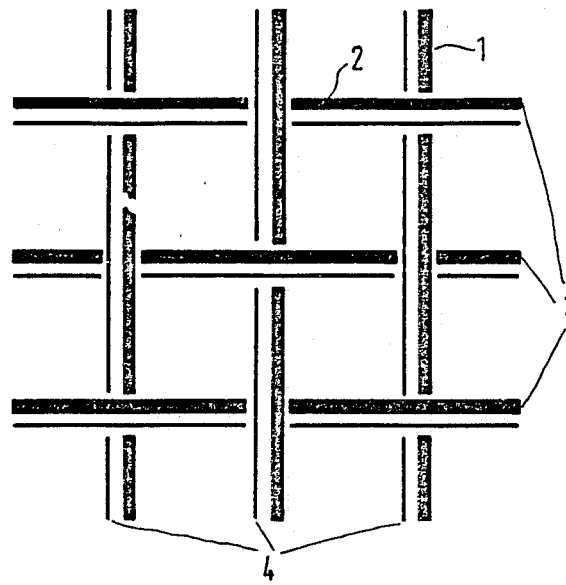
FIG. 3 illustrates a third exemplified embodiment of the line code lattice.

The exemplified embodiments indicate possibilities to feed data for road courses with the aid of a scanning pen of an evaluation electronic of a navigational system. FIG. 1 illustrates an example of a line code lattice which is suitable, for the scanning. The reference numeral 1 indicates the vertical groups of lines and the reference numeral 2 the horizontal lines. The difference between the vertical and the horizontal line groups in the lattice is recognized from the bar code structure. For example, the horizontal groups of lines are provided with two thick bars and a thin one, while the vertical goups of lines have a thick bar and two thin bars. The line code lattice is so structured or interleaved that at one crosspoint the vertical and at the next cross-point the horizontal pattern is arranged on top alternately for all crossing points. A further modification is illustrated in FIG. 2. The line code in accordance with FIG. 2 is provided with only two lines in both line groups, whereby the line distance in horizontal groups of lines 2 is smaller than in vertical groups of lines 1. A third possibility is indicated in FIG. 3. The horizontal groups of lines 2 and the vertical groups of lines 1 consist of two lines, a narrow one and a wide one, which are arranged in equidistance from each other, whereby the differentiation is performed by two different colors 3 and 4.

Principally it is required for the navigation when using line codes that the four movement possibilities of a scanning pen, namely right, left up and down are recognizeable, whereby the position of the sensor with respect to the two axes of the code play no particular role. This condition is fullfilled in the three aforementioned examples of line codes. The size of the line grating as such is important for the resolution to be obtained with the line grating.

With advantage, the line grating in accordance with one of the FIGS. 1 to 3 is imprinted with a suitable known fluorescing or phosphorescing color ink in the map material. If a direct printing is out of the question because the map material may already contain substances, for example, which are excited after illuminating by a corresponding radiation, the line code lattice may be imprinted onto a transparent foil which absorbs ultraviolet light and then being laminated or placed onto a standard map. Now, the fluorescing line code is present only on the foil alone. When illuminating with a corresponding light source (UV) the lattice is excited for fluorescence without simultaneously exciting the below mounted printed map paper. Processes for mounting of a line code lattice on a foil or on the map itself are known from the printing industry.

Since the printed line code consists of a fluorescing color which is not excited to a fluorescing state with daylight, the excitation is performed with an energy rich shortwave radiation. For this purpose a light pen with an intensive ultraviolet lamp is used for this purpose, for example. Light pens are already known in large numbers of types, so that constructive details do not have to be discuused. For an eventual reconstruction for use with an ultraviolet light the light pen "Ruby Wand" of the company Intermec is particularly suitable.

The light of the ultraviolet lamp penetrates through the permeable lower housing portion onto the line grating and excites the same for fluorescence action. Thereby, the fluorescing signal is received by a sensor and is fed directly to the evaluation circuit. It is also possible to construct the light pen with light conductors. Thereby, it is achieved that the light pen is particularly manageable. Thereby, the light of an ultraviolet lamp is fed throught light fibers to the reading position and illuminates the fluorescent substance. The transmitting fibers are disposed annularly around the receiving fibers which feed the emitted signal to a sensor which is also provided at a different location. A certain reading distance is maintained by means of a distance spacer. If need be, and after a certain adjustment for ultraviolet light beams, light pens with light conductors of the company Schölly Fiberoptic GmbH are suitable. In addition with the use for ultraviolet light it is also possible to use line patterns which absorb infrared light. For this purpose the map material is printed with infrared sensitive colors in form of a line pattern. Such a color is black, for example, if it is directly imprinted. If the color black is formed from the three primary colors it is not recognized by the infrared sensor. It is therefore possible to make maps when printing the same which contain two different types of black. One time the black print for stating the name, for example, of places and on the other hand the black paint for forming the grating, whereby the latter is only recognized by the infrared detector only. In order to assure the readability of the map material for the normal eye it is also possible to imprint a very fine grating which can be recognized faintly by the eye, but which is missed by the infrared sensor. Also when using infrared sensors the possibility exists to imprint the grating onto foils. For this purpose an infrared absorbing grating is imprinted onto an infrared reflecting foil or an infrared reflecting grating is imprinted onto an infrared absorbing foil. The foil is either structured that it can be mounted on the map or it is positively connected with the map. It is important that the card below is very well readable.

A conventional infrared light pen is used for reading which, for example, is made by the company Intermec under the name of Ruby Wand, Type 1236. In the interest of a good resolution of the very fine grating structure and a comfortable handling it is advantageous if the reading pens have a projection optics. The resolution is also determined by the density of the lattice. The highest density can be selected in the exemplified embodiment in accordance with FIG. 3. In contrast thereto the exemplified embodiment in accordance with FIG. 1 does not permit large densities of the lattice.

After transmitting a starting signal the pen is guided from a starting location through the roads which are printed on the map and after reaching the destination point the feeding is finished by transmitting a further signal. From the pulse sequence which is recorded by the pen when driving over the lattice the evaluation electronic recognizes the direction of the pen guiding and can illustrate the recorded road at scale on an indicator taking into account the known scales of the lattice and of the map. Hence, the road direction is clearly visible for the driver without any confusing details. Simultaneously, the result of the coupling navigation is displayed on the indicator during the navigation process, so that the driver always knows his momentary location.

Figure 4:
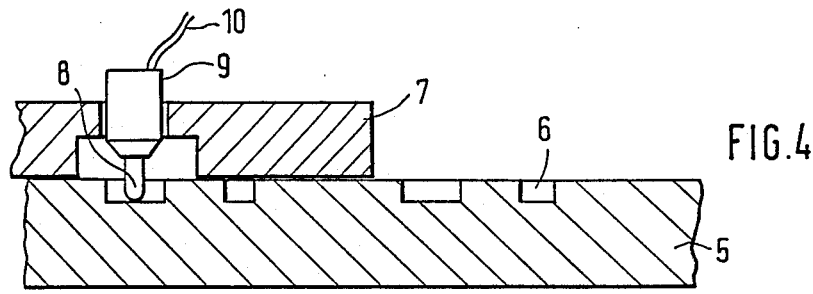
FIG. 4 illustrates an exemplified embodiment of the line code lattice with grooves.

In addition of the aforementioned optical scanning and data feeding of road directions it is further possible to perform these scanning and feeding operations by mechanical or electrical means. FIG. 4 illustrates an example of a mechanical feeding. In this case the lattice structures are imprinted in a way of an elevated printing on a transparent foil or in the form of a grating which is embossed into a transparent plastic foil which is placed over the map, so that with a pen provided with a microswitch the sequence of the coded lines can be scanned. When the pen tip is located on a lower level the switch is open and is closed on the upper level. In this manner a signal for the subsequently switched evaluation circuit can be generated. FIG. 4 illustrates an embossed grating 6 of plastic foil 5 being scanned by scanner 7. The scanner 7 has a microswitch 9 whose tip 8 drives along the contours on foil 5. The output signals are fed from line 10 to the evaluation circuit.

Analog thereto the elevated or embossed or grooved lattice structure may also be scanned with a phonograph pickup system as used in playback of records. For this purpose a phonograph pickup is used instead of the microswitch 9 in FIG. 4 being mounted in such a manner that the needle extends a few millimeters over the lower edge of the retaining plate. When the grating structure is scanned with this structure a signal is generated always when the phonographic pick up needle scans a flank of the given grating line.

Figure 5:
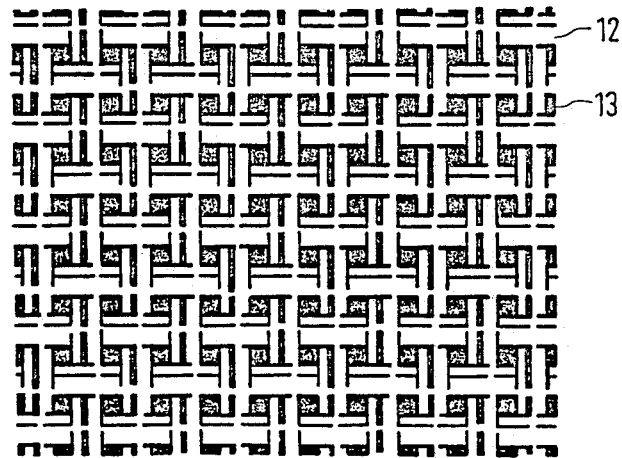
FIG. 5 illustrates an example of a line code lattice with an electrically conductive layer.

FIG. 5 illustrates an electrically conductive grating structure whereby the conductive electrodes 12 are illustrated in a light color and the nonconductive support 13 is illustrated in dark colors. In this process the grating structure is mounted in form of a transparent conductive electrode to a transparent support made of glass or plastic. The conductive electrode is made from tin-indium oxide, for example. The grating structure in accordance with FIG. 5 has to be etched out from a continous electrode on the plastic or glass plate in accordance with a known etching process, for example. The remaining layer portions become almost invisible after a heat treatment. This conductive grating structure is connected to a voltage source and therefore represents an equipotential face. While scanning the grating with a scanning head the grating potential can be picked up any time as long as a grating line is touched.

In the aforementioned lattice structures an undefined signal consequence may occur when the gap in a crossing point of two line combinations is scanned. These errors must be either accepted or must be eliminated by means of an increased circuit expense in the evaluation circuit.

The solution illustrated in FIG. 6 does not possess these difficulties. Thin transparent electrodes with a line pattern are mounted on glass or plastic between the voltage connections 16 and are connected with the conductors 16 by means of a low Ohm connection. In this arrangement a potential is generated which increases in the vertical in all lines not changing its value in the horizontal. If one describes a path over the conductive layer with a high Oh, pickup, as indicated in FIG. 6, an output signal is obtained which corresponds to the one in FIG. 7. The location is obtained in the horizontal direction by the evaluation electronic by counting the horizontal lines which at the same time permit a right-left-recognition, while the vertical results from the amplitude oof the picked up voltage which is directly proportional to the distance of the feeding point on account of the linearity of the resistance. No difficulties will appear on the crossing points in this type of illustration. FIG. 8 illustrates a suitable pen with the associated evaluation circuit. A glass plate 19 is mounted on the map 18 which contains the embossed transparent electrodes 14. The signal is picked up by menas of an electronic pen 21 which is of a high Ohm type. The output of the pen 21 is connected with an analog-digital-converter 22, on the one hand, and with a pulse preparation circuit 23, on the other hand. The analog voltage is converted into a digital signal by the analog-digital-converter 22, while the pulse preparation circuit 23 performs the recognition of the line combinations and establishes a digital signal for the horizontal x-coordinate. The otput signals of the analog-digital-converter as well as the pulse preparer are now fed to the evaluation circuit.

The aforementioned processes all enable to store the course of the desired travel. When starting the pen is activated by pushing a key, for example, and the pen is guided along the desired roads indicated on the map. When reaching a final destination point, the data input is finished by pressing the key again. The picked up signal sequence can now be graphically illustrated on an indicator unit. Due to the vehicle internal coupling navigation the driver always recognizes the part of the road which he is on, which way he had travelled and which way is still ahead of him. Furthermore, it is recognizeable whether he must change his driving direction, if need be.

However, in some cases it may be desirable to provide an absolute position feeding. FIG. 9 illustrates one exemplified embodiment wherein a graphic table is used for feeding the data. A transparent resistor face 38 is used for the active field. This resistor face is connected to very well conducting edge electrodes 30 and 27 or 29 and 28 by means of diodes 32 and 36 in the horizontal direction as well as in the vertical direction by means of diodes 25 and 31. The electrodes 27 and 28 are connected with the negative supply voltage of a voltage source 33 and the electrodes 29 and 30 are connected with one each output of a reverse switch 34. The positive supply voltage is connected with the input of switch 34. The signals of the graphic table can be picked up by means of an electric pen 35 and are intermediately stored in a sample and hold circuit 36. The signals of the sample and hold circuit 36 are fed to an analog-digital-converter 37 and are converted into a digital word.

The basis of the process is a homogeneous resistor surface at which a voltage is picked up through the pen 35 which is proportional to the location in accordance with the process of the unloaded voltage divider. It is essential that a homogeneous field and equipotentials are formed over the resistor surface which extend as straight lines parallel to the electrodes. This is a necessary requirement because during guiding of such a line the one coordinate must be constant. This requires only the use of two electrodes, for example, the electrodes 28 and 29. Thereby, the pen 35 can only pick up one coordinate. If both coordinates should be picked up two pairs of electrodes 28 and 29 and 27 and 30 have to be provided. When both electrodes are subject to voltage simultaneously an inhomogeneous field is generated and thereby potential lines which deviate from the straight line result. Hence, the electrodes 29 and 30 are cyclically connected to the operating voltage by means of a switch 34 and thereby the sample and hold circuit 36 is synchronously switched. The pair of electrodes which is not switched on is due to non-conductive diodes 25,26,31 and 32 ineffective on the resistor surface 38. Instead of an equipotential line a grating is obtained during the superimposition of the vertical and the horizontal equipotential line which assures an absolute feeding of the position. Furthermore, it is essential for maintaining the homogenity of the layers that the resistor surface is resistant against wear. Tempered tin-indium-oxide layers have been shown to be sufficiently stable. Glass as well as plastic, preferably polycarbonate foil have shown to be suitable as a substrate.

The horizontal and vertical coordinates which were scanned with the pen 35 are intermmediately stored in the sample and holding circuit 36 and after the analog-digital converter 37 are fed in the form of digital words into a computer and further prepared for the navigational system.

Independent from the geometric dimension of surface 38 one obtains a resolution which corresponds to the bit number of the analog digital-converter. An absolute position indication for the map coordinates is provided by this arrangement.

What is claimed is:

1. Process for determining navigation data from a map, particularly for use in vehicles, comprising the steps of applying on the map a line code lattice including crossing line codes formed, respectively, by a sequence of at least two parallel lines differing in width and/or in spacing; and scanning the line code lattice by a sensor.

2. Process in accordance with claim 1 wherein said sequence of lines extending in one direction differs from that extending in the transverse direction.

3. Process in accordance with claim 1 wherein said line code lattice consists of interleaved segments of said parallel lines.

4. Process in accordance with claim 1 wherein said codes differ in color.

5. Process in accordance with claim 1, wherein the coding consists of a wide line and a narrow line.

6. Process in accordance with claim 1 wherein the line code lattice is in a color which is not visible to the human eye.

7. Process in accordance with claim 6, wherein fluorescing or phosphorescing substances are used in the line code lattice.

8. Process in accordance with claim 1 wherein the line code lattice is made of a substance absorbing or reflecting infrared light.

9. Process in accordance with claim 1 wherein the line code lattice is imprinted on the map.

10. Process in accordance with claim 1 wherein the line code lattice is mounted on a transparent carrier which is then placed on the map.

11. Process in accordance with claim 1 wherein the line code lattice is in the form of elevations and/or embossings.

12. Process in accordance with claim 1 wherein the line code lattice is mounted on a transparent conductive electrode.

13. Process in accordance with claim 12, wherein the line code lattice is formed as a resistor.

14. Process in accordance with claim 11, wherein the line code lattice is imprinted on the map.

15. Process in accordance with claim 10, wherein said transparent carrier is a foil.

16. Process in accordance with claim 10, wherein said transparent carrier is glass.

17. Process in accordance with claim 10, wherein said transparent carrier is plexiglass.

* * * * *